United States Patent [19]

Miller, Jr.

[11] 4,149,252
[45] Apr. 10, 1979

[54] DIGITAL $p$-$\theta$ TO XY SCAN CONVERTER FOR USE WITH LIMITED ACCESS OR RANDOM ACCESS REITERATION MEMORY

[75] Inventor: Monroe A. Miller, Jr., N. Lauderdale, Fla.

[73] Assignee: The Bendix Corporation, Southfield, Mich.

[21] Appl. No.: 799,064

[22] Filed: May 20, 1977

[51] Int. Cl.² .............................................. H04N 5/02
[52] U.S. Cl. ................................... 364/456; 358/140; 343/5 SC; 364/731
[58] Field of Search ............... 364/520, 521, 731, 456, 364/815, 855, 200, 900; 343/5 SC, 5 DP; 358/140; 340/347 DA

[56] References Cited

U.S. PATENT DOCUMENTS

| | | | |
|---|---|---|---|
| 3,147,474 | 9/1964 | Kliman | 340/347 DA |
| 3,673,323 | 6/1972 | Gustafson | 358/140 |
| 3,765,018 | 10/1973 | Heard et al. | 343/5 SC |
| 3,792,194 | 2/1974 | Wood et al. | 358/140 |
| 3,827,027 | 7/1974 | Towson et al. | 343/5 SC |
| 3,904,817 | 9/1975 | Hoffman et al. | 358/140 |
| 4,002,827 | 1/1977 | Nevin et al. | 364/456 |
| 4,065,770 | 12/1977 | Berry | 343/5 SC |

FOREIGN PATENT DOCUMENTS 2266179 10/1975 France ........................... 343/5 SC
1326466 8/1973 United Kingdom ............ 358/140

OTHER PUBLICATIONS

Compendum of Visual Displays: Rome Air Development Center, R & Tech. Division Document, pp. IX-XII (introduction) Mar. 1967.
IBM Tech. Disclosure Bulletin: Radar Digital Scan Converter by L.B.Ii, vol. 17, No. 6, Nov. 1974, pp. 1677-1679.

Primary Examiner—Felix D. Gruber
Attorney, Agent, or Firm—W. G. Christoforo; B. L. Lamb

[57] ABSTRACT

In a non-storage CRT display system having a reiteration memory wherein video information is received in a $p\theta$ coordinate system and displayed on an XY raster the input coordinates are transformed as received digitized video information is transferred from an input buffer to the reiteration memory so that information previously stored in $p\theta$ format in the input buffer is subsequently stored in an XY format in the reiteration memory. The coordinate transformation is accomplished by calculating, at the completion of the read-out for display of a given horizontal line of data, the X and $\rho$ addresses of the reiteration memory cells to be up-dated from the input buffer during read-out of the subsequent horizontal line of data read-out. When the calculated X and horizontal X addresses correspond the reiteration memory is up-dated with calculated $\rho$ values.

5 Claims, 5 Drawing Figures

DIGITAL ρ-θ TO XY SCAN CONVERTER FOR USE WITH LIMITED ACCESS OR RANDOM ACCESS REITERATION MEMORY

BACKGROUND OF THE INVENTION

This invention relates to cathode ray tube display systems having a reiteration memory wherein a full raster frame of display data is stored for read-out onto the CRT at flicker-free rates and more particularly to such systems where data to be displayed is received in a first format, for example, $\rho\theta$, and displayed in a second format, for example, XY.

Data display systems providing flicker-free displays on CRT's have been known for many years. The Compendium of Visual Displays published in March 1967 by the Rome Air Development Center of the United States Air Force shows in its introduction a number of visual display systems including the display system in which the invention to be described below can be used and which provides the environment in which the present invention is explained. The Compendium at page X shows a display system having a buffer store, reiteration store, a data translation device in the form of a D/A converter and a transient image device in the form of a non-storage CRT. As explained in the text and known to those skilled in the art, the reiteration store, hereinafter termed a reiteration memory, has stored therein in digital form a complete frame of data to be displayed on the CRT. The stored data is read-out of the reiteration memory through the D/A converter synchonously with the drawing of the CRT raster by the use of the usual timing circuits. The buffer store simply holds new data therein until the appropriate section of the reiteration is instantaneously being addressed for read-out onto the CRT at which time the data temporarily stored in the buffer is used to up-date the reiteration store section being addressed. When the reiteration memory is read-out at rates at least of 30 times per second the result is the desired flicker-free display on a non-storage CRT.

The Compendium teaches that a number of different types of memories can be used as reiteration memories, for example, a core memory, which is known to be a type of random access memory (RAM) or a delay line, which is known to be a type of limited access memory (LAM).

In his U.S. Pat. No. 3,147,474 Kliman taught how data received in a first coordinate format can be transformed into a second coordinate format when the first data is stored into a core memory. He taught that by threading the cores with a first set of addressing wires in accordance with one coordinate format and also providing a second set of addressing wires in accordance with the desired output coordinate format then the second set of addressing wires can be easily utilized to read the data from the core memory in the desired coordinate format. In essence, Kliman simply provided two addressing means, one of which randomly addresses the memory to store the up-date data in the proper positions to be read-out by the second addressing means.

The art-described above suffers from the shortcoming that a random access reiteration memory must be used since the entry of data into the reiteration memory (or read-out if the obverse of the above described art is used) must be performed by random addressing of the memory.

With the present rapid development of new and improved, both functionally and economically, types of memories it sometimes becomes advantageous to be able to easily produce second and succeeding generations of equipments using newly developed or available memories in order to simplify the design effort in improving subsequent generation equipment. For example, at various times the state of the art is such that RAM's have certain advantages over LAM's, while at other times the state of the art advances and these advantages reverse. It is thus desirable that a universal means of converting coordinates for display systems be devised. In other words, a coordinate conversion means which can be used with either a RAM or LAM reiteration memory in the flicker-free display art would be advantageous.

SUMMARY OF THE INVENTION

The present invention comprises a universal coordinate conversion means for use in the flicker-free display art. The invention will be described below in a radar environment wherein digitized video data corresponding to an azimuth line of data is available at the input buffer in a $\rho\theta$ format but then stored in the reiteration memory for simple read-out therefrom in XY format onto an XY-CRT raster. Briefly, the azimuth address of the buffer stored data is related to the radar beam pointing angle and hence is known. In addition, the pattern of raster Y-addresses is predetermined and hence also known. At the completion of a given horizontal raster line, the subsequent raster Y-address and the buffer azimuth address are used to calculate $\rho$ and the X boundaries where $\rho$ is the range address of the buffer data and the boundaries comprise the horizontal addresses on the subsequent horizontal line corresponding to the calculated $\rho$. In other words, the particular range cell in the input buffer which is to be used to up-date the calculated X addressed range cell in the reiteration memory during the subsequent horizontal raster line is determined. A means comparing the X boundary addresses with the raster X position as the subsequent horizontal raster line is drawn on the face of the CRT provides a signal which allows the reiteration memory to be up-dated at the appropriate instant. As should be obvious from the above, this method of scan conversion using a comparator permits up-dating to occur in a quasi-random fashion as the reiteration memory is continuously read-out in XY format, that is, as the reiteration memory data flows through a single access point. The invention is thus adapted for simple use with either random access or limited access reiteration memories.

It is thus an object of this invention to provide a coordinate conversion means which can be used with either a random access or limited access reiteration memory.

DESCRIPTION OF THE PREFERRED EMBODIMENT

Figure 1:
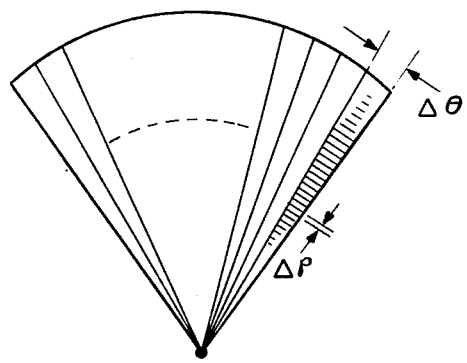
FIG. 1 illustrates a sector of a PPI display in $\rho\theta$ format.

As well known, a pulsed radar such as a search type radar generally transmits a series of pulses (PRF's) from a central location as the transmitted beam moves through an angle having an origin at the transmitter location. The radar returns resulting from these transmissions are generally received in a $\rho\theta$ format and can be displayed directly on a $\rho\theta$ raster to produce a plan position indication such as illustrated at FIG. 1, reference to which should be made. Due to the width of the antenna beam and the parameters of the display system each return represents some angular portion of space such as represented at $\Delta\theta$ of FIG. 1. Each return is also divided in convenient range increments or cells represented, for example, as $\Delta\rho$. Thus the position of information or data contained in a radar return signal can be identified by its $\rho\theta$ coordinates. As known to those skilled in the art these coordinates correspond respectively to the distance of a target from some point of reference, usually the common antenna of the radar R-T unit, and the direction from which the radar return is received.

Figure 2:
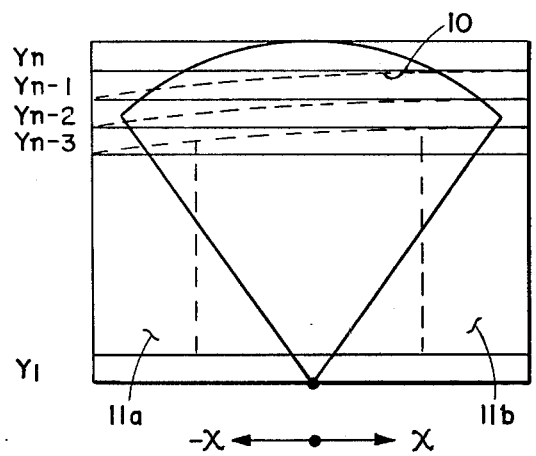
FIG. 2 illustrates a rectangular XY raster having the PPI display of FIG. 1 overlaid thereon.

Although the radar scan return can be displayed as a PPI representation on a CRT having an effective circular sector display surface to coincide with the actual display, it is sometimes desired to display the radar scan return on a rectangular raster such as the raster of FIG. 2 whereon the sector of FIG. 1 is superimposed. In FIG. 2, the basic raster is an XY raster comprised of a plurality of closely spaced horizontal lines $Y_n$, $Y_{n-1}$ ... $Y_1$ generated by a flying spot which scans across the face of the CRT, generally from left to right as viewed head on. The flying spot is extinguished at the end of each horizontal raster line, for example, line $Y_n$, while it is returned to the starting point of the subsequent horizontal raster line, in this case line $Y_{n-1}$, along the dotted path 10. It should be understood that each horizontal raster line has some width depending upon the parameters of the CRT and system so that the raster appears to be continuous to the human eye.

Drawing the radar return scan on a rectangular raster permits further information to be drawn into the unused portions such as at the lower right and left hand portions of the raster 11a and 11b respectively in this embodiment.

Each incremental portion of the raster is identified by an XY address where the X address is the horizontal distance of the display from the vertical center line of the CRT face and the Y address is the horizontal raster line.

Figure 3:
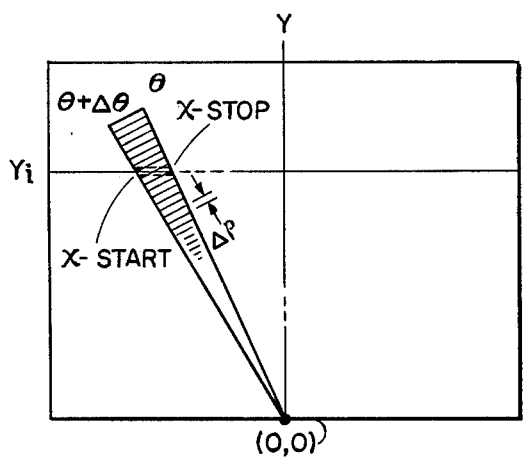
FIG. 3 shows an azimuth line of data in $\rho\theta$ format corresponding to a radar return signal overlaid on an XY raster.

Refer now to FIG. 3 which shows in more detail a single $\rho\theta$ formatted azimuth return superimposed on an XY raster. As previously explained the radar return has a finite angular dimension $\Delta\theta$, in this case extending from $\theta$ to $\theta+\Delta\theta$, and is divided into range cells, each of incremental range $\Delta\rho$. Of representative interest is the intersection of the radar return representation with a horizontal raster line, here line $Y_i$. Also of interest are the X addresses on the $Y_i$ line coinciding with the radar return representation.

Figure 4:
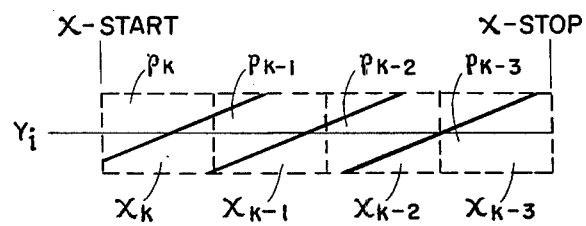
FIG. 4 shows in greater detail the significant portion of FIG. 3.

The intersection is seen in greater detail in FIG. 4, reference to which should now be made. The intersection comprises XY cells having the Y address $Y_i$ and X addresses from X-start to X-stop, that is, cells $X_k$, $X_{k-1}$, $X_{k-2}$ and $X_{k-3}$. Superimposed in these XY cells are portions of the radar return cells $\rho_k$, $\rho_{k-1}$, $\rho_{k-2}$ and $\rho_{k-3}$. In the present embodiment, assuming the radar return illustrated in FIG. 3 to be used to up-date a reiteration memory, the invention dictates that XY cell $X_k$ be up-dated by cell $\rho_k$, cell $X_{k-1}$ be up-dated by cell $\rho_{k-1}$, cell $X_{k-2}$ be up-dated by cell $\rho_{k-2}$ and cell $X_{k-3}$ be up-dated by cell $\rho_{k-3}$. Of course, the above mentioned up-dating according to the present invention, will be accomplished during the drawing of line $Y_i$ and particularly while the flying spot moves along line $Y_i$ between X-start and X-stop.

In the specific embodiment of the invention to be described below it will be explained that during each horizontal raster line, for example, during line $Y_{i+1}$ and also during the fly-back to the beginning of line $Y_i$ the following calculations are made:

$$X\text{-Stop} = Y_i C \tan \theta$$

$$X\text{-Start} = Y_i C \tan (\theta + \Delta\theta)$$

$$\rho\text{Cal} = Y_i \sec \theta$$

where C is a constant.

In the present embodiment $\rho$cal is the range cell contained in the input buffer that will be first passed to gate 18 for up-dating reiteration memory 26 when the X address equals X-start. Thereafter, for the example of FIG. 3, adjacent range cells in order of decreasing range will be clocked out of buffer 16 to gate 18 at a rate which depends upon the antenna azimuth angle $\theta$. In this embodiment the aforementioned rate is predetermined for each value of $\theta$. Thus, for example, with reference to FIG. 4 the rate will be predetermined with respect to the speed at which raster line $Y_i$ is drawn (usually a constant) to cause the reiteration memory to be up-dated as cited above and the current value of $\theta$. That is, to repeat, buffer cells $\rho_k$, $\rho_{k-1}$, $\rho_{k-2}$ and $\rho_{k-3}$ will be used to respectively up-date reiteration memory cells $X_k$, $X_{k-1}$, $X_{k-2}$ and $X_{k-3}$. Of course, as previously mentioned, when the X address becomes equal to X-stop the up-dating for that particular horizontal raster line will cease due to the closing of gate 18. As another example, assume that the antenna is pointing straight ahead. In that case a horizontal raster line will intersect only a single range cell, $\rho$cal, of the input buffer and the rate at which subsequent buffer range cells are sampled to gate 18 will be zero. That is, for that particular antenna azimuth only $\rho$cal is used for up-dating. At the other extreme, assuming a 180° display with the antenna at a 90° angle with respect to straight ahead, the rate at which buffer range cells are sampled to gate 18 will be a maximum as should now be obvious. It should also be obvious that for an antenna position to the left of straight ahead, as in FIG. 3, the input buffer range cells are sampled from $\rho$cal in decreasing range order from X-start to X-stop, while for an antenna position to the right of straight ahead the input buffer range cells are sampled from $\rho$cal in increasing range order from X-start to X-stop.

Means by which the rate at which the input buffer is sampled are known in the art. For example, a phase locked loop whose frequency (rate) was dependent on $\theta$ could be used to provide analog change of rate. In the present embodiment a cascade of flip-flops triggered by a source of clock pulses provides a suitable rate by selecting the output signal from a predetermined flip-flop in accordance with $\theta$.

Figure 5:
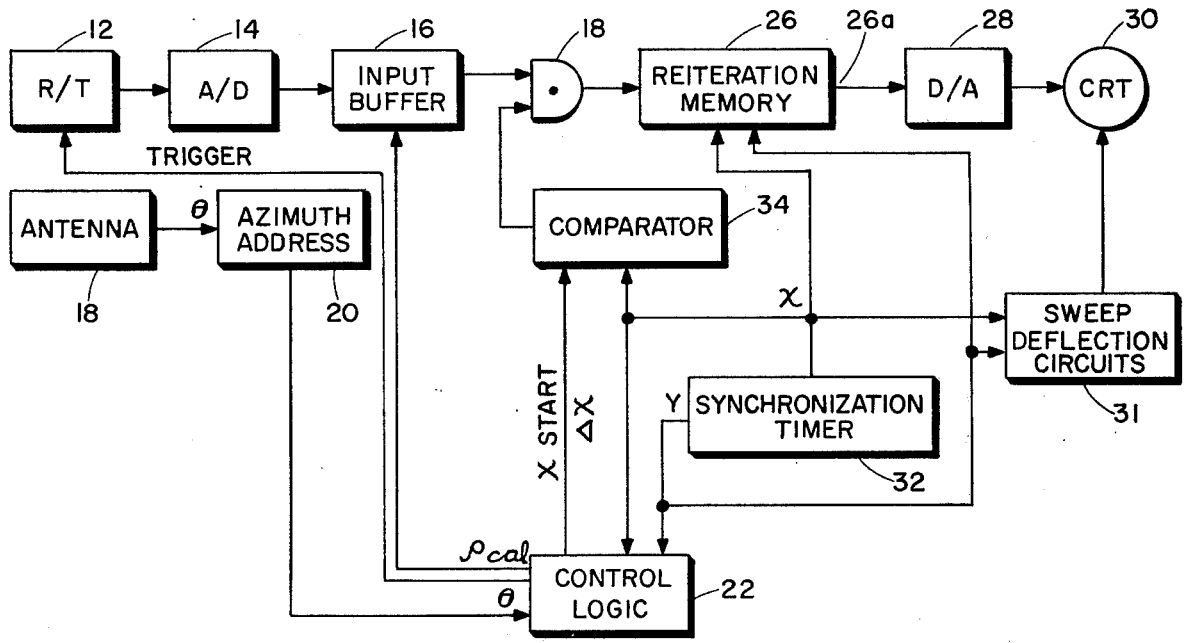
FIG. 5 comprises a block diagram of the invention as used in a radar environment.

Refer now to FIG. 5 which shows a block diagram embodiment of the invention. Here a radar receiver-transmitter (R/T) unit is triggered by a control unit 22 to transmit the usual pulses (PRF's) and receives the resulting radar return signals whose video components are converted to a digital format by analog-to-digital A/D converter 14 as is conventional. The digitized video return is temporarily stored in input buffer 16 together with the video return azimuth address $\theta$ which is stored in register 20, having been generated in the usual manner to drive the antenna 18. The illustrated embodiment also includes a reiteration memory 26 which can be either of the RAM or LAM type as will become clear as this description proceeds. As known in the art the reiteration memory has stored therein one frame of digital data, in the present embodiment in an XY format. What is meant by storage in an XY format is simply that as an XY raster is drawn as described above on CRT 30 by XY addresses generated by synchronization timer 32 and acting through sweep deflection circuits 31, the appropriate data is read-out of reiteration memory 26 by the same addresses for display, through digital-to-analog (D/A) converter 28 onto CRT 30. As should be obvious to one skilled in the art, for the case where a RAM reiteration memory is used in the invention, the individual cells of the memory are addressed by both X and Y addresses. However, in the case where a LAM, such as a recirculating memory is used in the embodiment, only the X address need be applied to the memory in the form of a clock pulse for each increment of X-address so as to cause the information stored therein to continuously circulate. Of course, for LAM's as the information is recirculated and becomes available at access port 26a it is not only recirculated into the memory (except where it is up-dated as will be explained but is also applied through D/A converter 28 for display on CRT 30. Of course, as usual in this art, provision is made, usually in timer 32, for the flying spot fly-back, during which time data is not clocked out of reiteration memory 26. This is accomplished by providing fly-back addresses which are applied to the CRT but are ineffective as to the other parts of the system such as the reiteration memory.

The XY address together with the azimuth address $\theta$ are applied to control logic 22 which, during the line and fly-back period considers the relationship of the subsequent line Y address and the azimuth address of the data stored in the input buffer to determine X-start and X-stop. In this embodiment the specific calculations made are:

X-Stop = $YC \tan \theta$

X-Start = $YC \tan (\theta + \Delta\theta)$ where $\Delta\theta$ is related to the antenna azimuth increment and the interval from X-start to X-stop is termed $\Delta X$. In addition an initial value of $\rho$ is calculated for the XY memory cell X-start as follows:

$\rho$cal = $Y_i \sec \theta$ where $\theta$ is the antenna pointing angle as previously mentioned. Values of $\rho$ between X-start and X-stop are incremented/decremented from $\rho$cal at a predetermined rate based upon the angle $\theta$. X-start and $\Delta X$ are applied as one input to comparator 34, the other input of which are the X addresses from synchronization timer 32. When the X addresses lie within the interval $\Delta X$ a signal qualifies gate 18, which may alternately be an electronic switch which is closed by the comparator output signal, thus permitting data from input buffer 16 to be entered into reiteration memory 26 for up-dating thereof. It should be understood that in this embodiment data proceeds through gate 18 in serial fashion, the specific data bit from the input buffer being chosen by the $\rho$cal signal from control logic 22. Thus, in the illustration of FIG. 4, for example, the signal X would define the interval during which the CRT flying spot draws XY cells $X_k$, $X_{k-1}$, $X_{k-2}$ and $X_{k-3}$ on the $Y_i$ horizontal raster line, during which interval comparator 34 causes gate 18 to be qualified. In addition $\rho$cal is calculated and generated. Then, while the flying spot is drawing XY cell $X_k$ (and simultaneously the corresponding cell in reiteration memory 26 is being addressed as should now be clear), control logic 22 generates:

$$\rho\text{cal} = \rho_k,$$

thus strobing range cell $\rho_k$ from input buffer 16 through qualified gate 18 into reiteration memory 26 for up-date. When the flying spot then enters XY cell $X_{k-1}$ on line $Y_i$, in response to the X address from synchronization timer 32, control logic 22 which includes the aforementioned cascade of flip-flops responsive to $\theta$ then generates:

$$\rho = \rho\text{cal} + n = \rho_{k-1},$$

thus strobing range cell $\rho_{k-1}$ from input buffer 16 through qualified gate 18 into reiteration memory 26 for up-date. This action continues until XY cells $X_{k-2}$ and $X_{k-3}$ on line $Y_i$ are also up-dated. Up-dating of the reiteration memory continues as the flying spot draws the remaining CRT horizontal raster lines until at the completion of one complete frame of data drawn on CRT 30 the entire azimuth line of data stored in input buffer 16 has been used to up-date the appropriate cells of reiteration memory 26.

One skilled in the art from a reading and understanding of the above described invention can easily adapt the invention to other types of reiteration memory displays. For example, means can be provided to integrate a series of radar return signals and place the results of such integration into the input buffer for noise filtering purposes before up-dating the reiteration memory. Also, scan-to-scan filtering of up-date of the type found in the art might be provided. Also, the embodiment described implies that a multilevel digital signal (that is a signal comprised of logical "1's" and "0's" corresponding to target hits and misses, respectively) can be processed by the invention. Multilevel signals can be processed by using the parallel channels taught in the prior art, thus permitting signals having $2^n$ levels, where n is equal to the number of parallel channels, to be displayed. In addition, the PRF might be of such rate as to require additional parallel input buffer stages to eliminate loss of data. Since these and other obvious alterations and modifications of the invention should now suggest themselves to one skilled in the art, the property which I claim is to be limited only by the true spirit and scope of the appended claims.

The invention claimed is:

1. A scan converting display system for displaying digitized data available in a polar format defined by $\rho\theta$ addresses and comprised of a plurality of lines radiating from a common focus, each said line being defined by a predetermined $\theta$ address onto a rectangular raster defined by XY addresses wherein the raster is comprised of a plurality of substantially parallel raster lines, each said raster line having a Y address comprising:

means for generating a repeating sequence of X and Y addresses;

means for generating said raster in response to said repeating sequence of X and Y addresses;

a reiteration memory means responsive to said repeating sequence of X and Y addresses for reading data stored in said reiteration memory means onto said means for generating said raster synchronously with said raster whereby said data is displayed on said raster;

means for temporarily storing a line of the polar format digitized data in uniform increments of $\rho$;

means for generating as a function of the $\theta$ address of the line of the polar format digitized data in said means for temporarily storing and said X and Y addresses $\rho$cal signals corresponding to $\rho$ addresses of data in said means for temporarily storing and a signal defining the cells of said reiteration memory to be up-dated during the generation of a particular raster line; and, means for comparing said X address with the signal defining the cells of said reiteration memory to be up-dated for generating an up-date signal, said means for temporarily storing being responsive to the $\rho$cal signals and said up-date signal to up-date said reiteration memory with data at corresponding $\rho$ addresses in said means for temporarily storing.

2. The scan converting display system of claim 1 wherein said means for generating said raster comprises a non-storage cathode ray tube.

3. The scan converting display system of claim 1 wherein said means for generating said raster comprises a cathode ray tube.

4. The scan converting display system of claim 1 wherein said reiteration memory means comprises a limited access memory.

5. The scan converting display system of claim 1 wherein said reiteration memory means comprises a random access memory.

* * * * *